United States Patent
Eoff et al.

(10) Patent No.: US 7,128,148 B2
(45) Date of Patent: Oct. 31, 2006

(54) WELL TREATMENT FLUID AND METHODS FOR BLOCKING PERMEABILITY OF A SUBTERRANEAN ZONE

(75) Inventors: Larry S. Eoff, Duncan, OK (US); Michael J. Szymanski, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 180 days.

(21) Appl. No.: 10/826,615

(22) Filed: Apr. 16, 2004

(65) Prior Publication Data

US 2005/0230113 A1    Oct. 20, 2005

(51) Int. Cl.
*E21B 33/138*    (2006.01)
*E21B 21/00*    (2006.01)

(52) U.S. Cl. ............ 166/250.14; 166/288; 166/295; 166/300; 175/72; 507/224; 507/225; 507/226; 507/229; 507/230; 507/903; 523/130

(58) Field of Classification Search ............ 166/288, 166/250.14, 294, 295, 300; 175/72; 507/224, 507/225, 226, 229, 230, 903; 523/130
See application file for complete search history.

(56) References Cited

U.S. PATENT DOCUMENTS

| | | | | |
|---|---|---|---|---|
| 3,669,188 A | * | 6/1972 | Coles et al. ............... | 166/270 |
| 4,741,401 A | | 5/1988 | Walles et al. .............. | 166/300 |
| 4,940,091 A | | 7/1990 | Shu et al. ................... | 166/270 |
| 4,964,463 A | | 10/1990 | Shu ............................ | 166/274 |
| 4,973,410 A | | 11/1990 | Pinschmidt, Jr. et al. | |
| 5,010,953 A | | 4/1991 | Friedman et al. ........... | 166/288 |
| 5,022,466 A | * | 6/1991 | Shu et al. ................ | 166/272.2 |
| 5,071,890 A | * | 12/1991 | Shu et al. ................... | 166/288 |
| 5,085,787 A | | 2/1992 | Pinschmidt, Jr. et al. | |
| 5,103,909 A | * | 4/1992 | Morgenthaler et al. ..... | 166/288 |
| 5,525,665 A | | 6/1996 | Moeggenborg et al. ..... | 524/430 |
| 5,609,209 A | | 3/1997 | Shu ............................ | 166/295 |
| 5,836,392 A | | 11/1998 | Urlwin-Smith ............. | 166/295 |
| 5,944,106 A | | 8/1999 | Dalrymple et al. ......... | 166/281 |
| 6,070,664 A | | 6/2000 | Dalrymple et al. ......... | 166/281 |
| 6,176,315 B1 | | 1/2001 | Reddy et al. ............... | 166/295 |
| 6,476,169 B1 | | 11/2002 | Eoff et al. ................ | 526/307.2 |
| 6,494,263 B1 | | 12/2002 | Todd .......................... | 166/312 |
| 2005/0000694 A1 | * | 1/2005 | Dalrymple et al. ......... | 166/307 |

* cited by examiner

*Primary Examiner*—George Suchfield
(74) *Attorney, Agent, or Firm*—Robert A. Kent; Crutsinger & Booth

(57) ABSTRACT

The present invention provides a method and treatment fluid for blocking the permeability of an elevated-temperature zone in a reservoir of a subterranean formation penetrated by a wellbore, the method comprising the steps of: a) selecting the zone to be treated, wherein the upper limit of the temperature range of the zone is equal to or greater than 190° F. (88° C.); b) forming a well treatment fluid comprising: water; a water-soluble polymer comprising polymerized vinyl amine units; and an organic compound capable of crosslinking with the vinyl amine units of the water-soluble polymer; c) selecting the water-soluble polymer and the organic compound of the well treatment fluid such that the gel time of the well treatment fluid is at least 2 hours when measured at the upper limit of the temperature range of the zone; and d) injecting the well treatment fluid through the wellbore and into the zone.

27 Claims, No Drawings

WELL TREATMENT FLUID AND METHODS FOR BLOCKING PERMEABILITY OF A SUBTERRANEAN ZONE

STATEMENT REGARDING FEDERALLY SPONSORED RESEARCH OR DEVELOPMENT

Not applicable

REFERENCE TO MICROFICHE APPENDIX

Not applicable

FIELD OF THE INVENTION

The invention generally relates to aqueous well treatment fluids and to methods for treating a subterranean formation. More specifically, the invention is directed to well treatment fluids and methods used to control water production and thereby enhance the production of oil or gas.

BACKGROUND OF THE INVENTION

As a hydrocarbon-producing well matures, increasing water production becomes a serious problem. To reduce the production of undesired water or gas from a hydrocarbon-producing formation, aqueous polymer fluids containing crosslinking agents have been used. Such aqueous polymer fluids have been pumped into the hydrocarbon-producing formation so as to allow them to enter the water zones within and adjacent to the formations and crosslink. Such fluids have been pumped into and adjacent to water producing formations and allowed to crosslink. Crosslinking causes the aqueous polymer fluids to form a stiff gel that stops or reduces the undesired water and/or gas flow. Remediation techniques such as these are generally referred to as conformance control. Remediation techniques are selected on the basis of the water source and the method of entry into the wellbore. Conformance control treatments include sealant treatments and relative permeability modifiers (also referred to as disproportionate permeability modifiers).

A water-soluble chromium (3+) crosslinked polyacrylamide gel has been used in conformance control treatments. The gel time is usually controlled by the addition of materials that chelate with chromium in competition with the polymer-bound carboxylate groups. The crosslinking reaction in this gel system takes place by the complexation of Cr (3+) ions with carboxylate group on the polymer chain. The chemical bond between Cr (3+) and the pendant carboxylate group facilitates the formation of insoluble chromium species that can occur at high pH values. Other problems with this system include environmental concerns, thermal instability, unpredictable gel time, and gel instability in the presence of chemical species that are potential ligands.

Another water-based gel system for conformance control is based on phenol/formaldehyde crosslinker system for homo-, co-, and ter-polymer systems containing acrylamide. The crosslinking mechanism involves hydroxymethylation of the amide nitrogen, with subsequent propagation of crosslinking by multiple alkylation on the phenolic ring. Because of the nature of this chemical bond, the gel time is controllable over a wide temperature range. Although effective in gel systems, phenol and formaldehyde are highly toxic and are considered environmental hazards.

Still another water-based gel system for conformance control is based on a polyethyleneimine (PEI) crosslinker and a copolymer of acrylamide and t-butyl acrylate. PEI is a low-toxicity material that has been approved in the United States by the Food and Drug Administration for food contact. Although non-toxic, PEI may bio-accumulate or persist in the environment for long periods.

While the use of aqueous polymer fluids to reduce undesired water production has achieved varying degrees of success, these crosslinking agents are undesirable in that they either have low gel stabilities at high temperatures, have high toxicities, and/or bio-accumulate in the environment.

Thus, improved well treatment fluids and methods used to control water production and thereby enhance the production of oil or gas are needed.

SUMMARY OF THE INVENTION

The present invention provides a method for blocking the permeability of an elevated-temperature zone in a reservoir of a subterranean formation penetrated by a wellbore, the method comprising the steps of: a) selecting the zone to be treated, wherein the upper limit of the temperature range of the zone is equal to or greater than 190° F. (88° C.); b) forming a well treatment fluid comprising: water; a water-soluble polymer comprising polymerized vinyl amine units; and an organic compound capable of crosslinking with the vinyl amine units of the water-soluble polymer; c) selecting the water-soluble polymer and the organic compound of the well treatment fluid such that the gel time of the well treatment fluid is at least two hours when measured at the upper limit of the temperature range of the zone; and d) injecting the well treatment fluid through the wellbore and into the zone.

The present invention also provides a well treatment fluid for blocking the permeability of an elevated-temperature zone in a reservoir of a subterranean formation penetrated by a wellbore, the well treatment fluid comprising: water; a water-soluble polymer comprising polymerized vinyl amine units; and an organic compound capable of crosslinking with the vinyl amine units of the water-soluble polymer, wherein the water-soluble polymer and the organic compound of the well treatment fluid are selected such that the gel time of the well treatment fluid is at least two hours when measured at 190° F. (88° C.).

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

DETAILED DESCRIPTION OF PRESENTLY MOST PREFERRED EMBODIMENTS AND CURRENT BEST MODE

The present invention provides a well treatment fluid for blocking the permeability of an elevated-temperature zone in a reservoir of a subterranean formation penetrated by a wellbore. The well treatment fluid comprises water; a water-soluble polymer comprising polymerized vinyl amine units; and an organic compound capable of crosslinking with the vinyl amine units of the water-soluble polymer. The water-soluble polymer and the organic compound of the well treatment fluid are selected such that the gel time of the well treatment fluid is at least two hours when measured at 190° F. (88° C.). This allows time to inject the well treatment fluid into the subterranean zone before it forms the gel.

The well treatment fluid for use in the present invention is circulated or spotted within a borehole during well drilling or servicing operations. The well treatment fluid can be formulated to provide a viscous gel to overcome lost circulation problems associated with a wellbore.

The water used for the well treatment fluid can be of any convenient source, including fresh water, seawater, natural brine, formulated brine, 2% KCl solution, and any combination in any proportion of the foregoing. Formulated brine is manufactured by dissolving one or more soluble salts in water, natural brine, or seawater. Representative soluble salts are the chloride, bromide, acetate and formate salts of potassium, sodium, calcium, magnesium and zinc. The preferred water for the well treatment fluid of the present invention is 2% KCl solution.

The well treatment fluid comprises a water-soluble polymer comprising polymerized vinyl amine units. The water-soluble polymer can comprise vinyl alcohol units. In addition, the water-soluble polymer can comprise a copolymer of vinyl amine units and vinyl alcohol units, also known as polyvinyl amine/vinyl alcohol (PVAM-PVOH). Such copolymer can be in the form of a salt. One advantageous method of preparing the water-soluble polymer for use in the present invention can be made by copolymerizing vinyl acetamide (or vinyl formamide) with vinyl acetate, and then hydrolyzing the copolymer to provide the resulting polymer, which would then comprise of vinyl alcohol units and vinyl amine units. The hydrolysis step results in the amine and alcohol groups being present in the polymer. In such polymers, some residual acetate and acetamide (or formamide) groups also exist in the polymer for use in the present invention.

The polymer comprising polymerized vinyl amine units is useful to crosslink with common compounds that are known to crosslink with polyetheleneimine. Advantageously, polymers such as PVAM-PVOH lack hydrolysable linkages, such as ester groups, which sometimes lead to gel degradation.

The well treatment fluid also comprises an organic compound capable of crosslinking with the vinyl amine units of the water-soluble polymer. The organic compound can also comprise of an organic compound selected from the group consisting of polyacrylamide; acrylamide/t-butyl acrylate copolymer; alkyl acrylate polymer; 2-acrylamido-2-methyl-propane sulfonic acid/acrylamide copolymers; sulfonated styrene/maleic anhydride copolymers; vinylpyrrolidone/2-acrylamido-2-methylpropane sulfonic acid/acrylamide terpolymers; 2-acrylamido-2-methylpropane sulfonic acid/N-N-dimethylacrylamide/acrylamide terpolymers; sulfonated styrene/maleic anhydride copolymer; a vinyl pyrrolidone/2-acrylamido-2-methylpropane sulfonic acid/acrylamide terpolymer; an 2-acrylamido-2-methylpropane sulfonic acid/N-N-dimethylacrylamide/acrylamide terpolymer; and any combination in any proportion of the foregoing. Preferably, the alkyl acrylate polymer comprises a polymer containing at least one unit selected from the group consisting of dimethylaminoethyl methacrylate, dimethylaminopropyl methacrylamide, quaternized dimethylaminoethyl methacrylate, and any combination in any proportion of the foregoing. The organic compound can also comprise of an acrylamide-based polymer.

The concentration of the PVAM-PVOH in the well treatment fluid is selected to give a desired gel time. Preferably, the water-soluble polymer comprising polymerized vinyl amine units has up to 50 mole % vinyl amine units. More preferably, the water-soluble polymer comprising polymerized vinyl amine units has up to 15 mole % vinyl amine units. Also, the water-soluble polymer comprising a copolymer of vinyl amine units and vinyl alcohol units can have up to 50 mole % polymerized vinyl amine units, and preferably, up to about 15 mole % vinyl amine units. The mole % of vinyl amine units of the water-soluble polymer can be selected to at least partially control the gel time of the treatment fluid when measured at 190° F. (88° C.).

Without being limited by theoretical explanation, it is believed that the higher proportion of polymerized vinyl amine units in the treatment speeds up the gel rate because the vinyl amine units are more available to crosslink with the other units.

For example, the ratio of water-soluble polymer to the acrylamide-based polymer can be from about 50:1 to about 1:1.

To further illustrate the present invention, and not by way of limitation, the following examples are provided.

EXAMPLE 1

As shown in Table 1, vinyl amine/vinyl alcohol copolymer is effective at crosslinking the base polymer made up of a copolymer of acrylamide and t-butyl acrylate (PA-t-BA), as well as base polymers polydimethylaminoethyl methacrylate (DMAEMA), polyacrylamide, and poly(2-acrylamido-2-methylpropane sulfonic acid/acrylamide). In this table, PVAM-PVOH-6 is the abbreviation for poly(vinyl amine/vinyl alcohol), with 6 mole % vinyl amine units. Also in this table, PVAM-PVOH-12 is the abbreviation for poly(vinyl amine/vinyl alcohol), with 12 mole % vinyl amine units. Table 1 shows the weight % of the base polymer and the weight % of the crosslinker (PVAM-PVOH-6 or PVAM-PVOH-12) in water (KCl is added such that the entire mixture is 2% by weight KCl). The base polymer and crosslinker were added to the mix water and stirred until homogeneous. The mixture was then placed in a closed glass vial, which was placed in an oven at the designated temperature. The vials were removed periodically and observed for the gel formation. The results indicate that increasing the amine level decreases the gel time. The results also show that the amine level can be tailored to suit a broad temperature range.

TABLE 1

Gel times with poly(vinyl amine/vinyl alcohol) as a crosslinker (PVAM-PVOH-6 comprising 6 mole % vinyl amine units and PVAM-PVOH-12 comprising 12 mole % of vinyl amine).

| Base Polymer | Weight % Base polymer | Weight % PVAM-PVOH-6 Crosslinker | Weight % PVAM-PVOH-12 Crosslinker | Temp (° F.) | Gel Time (hours) |
|---|---|---|---|---|---|
| PA-t-BA | 5 | 5 | — | 190 | None in 135 |
| PA-t-BA | 5 | — | 5 | 190 | 97 |
| PA-t-BA | 5 | 4 | — | 220 | 23 to 27 |
| PA-t-BA | 5 | — | 4 | 220 | 8 to 23 |
| PA-t-BA | 5 | 0.5 | — | 250 | 3 to 20 |
| PA-t-BA | 5 | — | 0.5 | 250 | 1 |
| DMAEMA | 6.4 | — | 4.6 | 220 | 3.5 to 5 |
| polyacrylamide | 5 | — | 5 | 190 | 15 |
| polyacrylamide | 5 | — | 4 | 190 | 25 |
| poly(2-acrylamido-2-methylpropane sulfonic acid/acrylamide) | 5 | — | 2 | 250 | 9 to 24 |

In conformance operations, a polymeric solution is pumped down a wellbore and into the matrix of the formation. The amount of the solution to be pumped depends upon several factors, including the length of the zone to be treated and the desired depth of penetration. This depth of penetration may vary, but is typically at least 2 feet away from the wellbore, and may be as much as 25 feet away from the wellbore. It is typically desired to place the entire amount of the polymer solution into the zone of interest before gelation takes place. Therefore, there is a finite amount of pumping time which must be available to place the solution. One factor involved in determining this time is the depth of the zone of interest. In addition, injectivity tests can be performed on the zone of interest, typically using brine solutions, which will reveal the rate at which fluids can be pumped into the zone. Thus, the amount of time required to pump the polymer solutions into place can be determined. This pump time will rarely be less than 1 hour. In addition, at least 1 hour is typically added to the determined pump time as a safety factor. For example, the pumping operation is interrupted in the cases of pump breakdown or other mechanical failures. Therefore, in practice, the pumping time will usually be more than 2 hours. It is therefore desirable to provide a gel time that is at least two hours.

A number of variables can be used to control gel time, or impact the gelling of the vinyl amine units with polymers when the vinyl amine units are used as a crosslinker. Such variables include type of water-soluble polymer, proportion of polymerized vinyl amine units in the water-soluble polymer, water-soluble polymer concentration, the type of organic crosslinker, crosslinker concentration, pH of the well treatment fluid, mix water, and temperature.

In comparing the ability of an organic compound to crosslink, or react with the vinyl amine units, the order of ease of crosslinking reactivity shows steric resistance to the approach of the amino group at the amide carbonyl group in copolymers such as 2-acrylamido-2-methylpropanesulfonic acid copolymer/acrylamide copolymer (AMPS/AA), due to the adjacent bulky groups on these polymers. Thus, the reactivity of partially hydrolyzed polyacrylamides is higher than the water-soluble compound having carbonyl groups with bulky co-units such as t-butyl acrylate and 2-acrylamido-2-methylpropanesulfonic acid copolymer.

Generally, by increasing the fraction of bulky or less reactive units in the polymer, the temperature at which gelation occurs can be increased, the pumping time at a given temperature can be increased and/or the stability of the gel formed can be increased or decreased. For example, when a subterranean zone to be sealed has a temperature in the range of from about 70° F. (21° C.) to about 230° F. (111° C.) and requires a pumping time in the range of from about 2 hours to about 96 hours, the water-soluble polymer utilized in the sealing composition can be polyacrylamide or AMPS/AA copolymer. When the subterranean zone has a temperature in the range of from about 200° F. to about 350° F. and requires a pumping time in the range of from about 2 hours to about 14 days, the water-soluble polymer can be a sulfonated styrene/maleic anhydride copolymer, a vinyl pyrrolidone/2-acrylamido-2-methylpropanesulfonic acid copolymer/acrylamide terpolymer, an 2-acrylamido-2-methylpropanesulfonic acid copolymer/N-N-dimethylacrylamide/acrylamide terpolymer, and any combination in any proportion of the foregoing.

In one aspect of the present invention, the organic compound can be selected from the group consisting of any one or more polymers comprising: a) polymerized units having a functionality capable of crosslinking with the vinyl amine units of the water-soluble polymer; and b) polymerized units having a sterically bulky functionality. Such organic compound can be selected from the group consisting of any one or more polymers comprising polymerized units of acrylamide. Preferably, the organic compound is further selected from the group consisting of any one or more polymers comprising: polymerized units of t-butyl acrylate, 2-acrylamido-2-methylpropanesulfonic acid, and any combination in any proportion of the foregoing. The organic compound can also be selected form the group consisting of any one or more polymers comprising: polymerized units of t-butyl acrylate, 2-acrylamido-2-methylpropanesulfonic acid, and any combination in any proportion of the foregoing. The organic compound can also be selected from the group consisting of: sulfonated styrene/maleic anhydride copolymer, a vinyl pyrrolidone/2-acrylamido-2-methylpropanesulfonic acid copolymer/acrylamide terpolymer, an 2-acrylamido-2-methylpropanesulfonic acid copolymer/N-N-dimethylacrylamide/acrylamide terpolymer, and any combination in any proportion of the foregoing.

Yet another variable that can be used to control gel time is the gel system pH. The crosslinking reaction proceeds more slowly with decreasing gel system pH. Without being limited by theory, it is believed that the lone pair of electrons on the amine nitrogen groups is expected to be protonated in acidic media, making them unavailable to initiate a nucleophilic attack on the water-soluble compound having carbonyl groups. Therefore, gel time can be partially controlled by varying the gel system pH. However, controlling the pH over time is difficult and complicated, and there has been a long-felt need for additional methods of controlling gel time, especially at elevated temperatures.

Still another variable that can be used to control gel time is the mix water, which is believed to effect the crosslinking reaction. The crosslinking reaction can proceed significantly faster in fresh water as compared to seawater. Similar results occur in the crosslinking reactions of the prior art, such as crosslinking reactions of PA-t-BA with PEI. However, this alone is usually not sufficient to adequately slow gel times at elevated temperatures.

Therefore, gel time can also be partially controlled by variables such as solution pH (lowering of pH increases gel times due to protonation of amino group in the vinyl amine), and base polymer/crosslinker ratio and the corresponding solution concentrations.

In high temperature applications, the polymer gel system that includes vinyl amine units as described in the present application can also be used as a crosslinker, which is difficult to achieve with treatment fluids that lack vinyl amine units due to very short gel times at such temperatures. It should be noted that gel time with the polymer gel system that includes vinyl amine units is more strongly influenced by temperature than the polymer/crosslinker ratios, or the corresponding concentrations especially at temperatures higher than 200° F. The base polymers have different reactivities with crosslinkers, which allow the selection of suitable water-soluble polymer having carbonyl groups for a wide range of elevated temperatures in conformance applications. The polymer gel system that includes vinyl amine units has thermal stability in the temperature range applicable to many conformance-related applications, making it commercially useful. In one aspect of the invention, the gel time of the well treatment fluid is less than 100 hours when measured at the upper limit of the temperature range of the zone. In another aspect of the invention, the gel time is less than 30 hours when measured at the upper limit of the temperature range of the zone.

The well treatment fluid of this invention generally will contain materials well known in the art to provide various characteristics of properties to the fluid. Thus, the well treatment fluid can contain one or more viscosifiers or suspending agents in addition to the polymer comprising at least one unit of vinyl amine, weighting agents, corrosion inhibitors, soluble salts, biocides, fungicides, seepage loss control additives, bridging agents, deflocculants, lubricity additives, shale control additives, pH control additives, and other additives as desired. The well treatment fluid can also contain one or more materials that function as encapsulating or fluid loss control additives to restrict the liquid's entry into the contacted shale. Representative materials include partially solubilized starch, gelatinized starch, starch derivatives, cellulose derivatives, humic acid salts (lignite salts), lignosulfonates, gums, biopolymers, synthetic water-soluble polymers, and any mixture in any proportion of the foregoing. If desired, water-soluble potassium compounds can be incorporated into the fluids of this invention to increase the potassium ion content thereof. It is known to add potassium chloride, potassium formate, potassium acetate, and the like to enhance the fluid's shale stabilizing characteristics.

A mixture of vinyl amine unit-containing compounds can be prepared for addition to the well treatment fluid of this invention for maintenance of the properties thereof, or indeed, for preparing well drilling and servicing fluids before adding the fluids of the present invention.

The present invention also provides a method for blocking the permeability of an elevated-temperature zone in a reservoir of a subterranean formation penetrated by a wellbore, the method comprising the steps of: a) selecting the zone to be treated, wherein the upper limit of the temperature range of the zone is equal to or greater than 190° F. (88° C.); b) forming a well treatment fluid comprising: water; a water-soluble polymer comprising polymerized vinyl amine units; and an organic compound capable of crosslinking with the vinyl amine units of the water-soluble polymer; c) selecting the water-soluble polymer and the organic compound of the well treatment fluid such that the gel time of the well treatment fluid is at least two hours when measured at the upper limit of the temperature range of the zone; and d) injecting the well treatment fluid through the wellbore and into the zone.

The upper limit of the temperature range of the zone can be equal to or greater than 250° F. (121° C.). Preferably, the upper limit of the temperature range of the zone is equal to or less than 350° F. (177° C.). More preferably, the lower limit of the temperature range of the zone is equal to or greater than 190° F. (88° C.).

The upper limit of the temperature range of the zone can also be equal to or greater than 250° F. (121° C.). Preferably, the upper limit of the temperature range of the zone is equal to or less than 350° F. (177° C.). More preferably, the lower limit of the temperature range of the zone is equal to or greater than 190° F. (88° C.).

Finally, the lower limit of the temperature range of the zone is equal to or greater than 190° F. (88° C.).

Any substantial flowback from the zone can be delayed for at least the gel time of the well treatment fluid after the step of injecting the well treatment fluid into the zone.

A breaker may also be injected into the zone. The breaker can be adapted to break a gel formed by the well treatment fluid.

After careful consideration of the specific and exemplary embodiments of the present invention described herein, a person of ordinary skill in the art will appreciate that certain modifications, substitutions and other changes may be made without substantially deviating from the principles of the present invention. The detailed description is illustrative, the spirit and scope of the invention being limited only by the appended Claims.

What is claimed is:

1. A method for blocking the permeability of an elevated-temperature zone in a reservoir of a subterranean formation penetrated by a wellbore, the method comprising the steps of:
   a. forming a well treatment fluid comprising:
      i. water;
      ii. a water-soluble polymer comprising polymerized vinyl amine units, wherein the water-soluble polymer further comprises polymerized vinyl alcohol units;
      iii. an organic compound capable of crosslinking with the vinyl amine units of the water-soluble polymer; and
   d. injecting the well treatment fluid through the wellbore and into the zone.

2. The method according to claim 1, wherein the water is selected from the group consisting of fresh water, seawater, natural brine, formulated brine, 2% KCl solution, and any combination in any proportion of the foregoing.

3. The method according to claim 1, wherein the organic compound comprises an acrylamide-based polymer.

4. The method according to claim 3, wherein the ratio of the water-soluble polymer to the acrylamide-based polymer is from about 50:1 to about 1:1.

5. The method according to claim 1, wherein the organic compound is selected from the group consisting of polyacrylamide; acrylamide/t-butyl acrylate copolymer; alkyl acrylate polymer; 2-acrylamido-2-methylpropane sulfonic acid/acrylamide copolymers; sulfonated styrene/maleic anhydride copolymers; vinylpyrrolidone/2-acrylamido-2-methylpropane sulfonic acid/acrylamide terpolymers; 2-acrylamido-2-methylpropane sulfonic acid/N-N-dimethylacrylamide/acrylamide terpolymers; sulfonated styrene/maleic anhydride copolymer; a vinyl pyrrolidone/2-acrylamido-2-methylpropane sulfonic acid/acrylamide terpolymer; an 2-acrylamido-2-methylpropane sulfonic acid/N-N-dimethylacrylamide/acrylamide terpolymer; and any combination in any proportion of the foregoing.

6. The method according to claim 5, wherein the alkyl aerylate polymer comprises a polymer containing at least one unit selected from the group consisting of dimethylaminoethyl methacrylate, dimethylaminopropyl methacrylamide, quaternized dimethylaminoethyl methacrylate, and any combination in any proportion of the foregoing.

7. The method according to claim 1, wherein the organic compound is selected from the group consisting of any one or more polymers comprising: polymerized units having a cross-linking functionality capable of crosslinking with the vinyl amine units of the water-soluble polymer.

8. The method according to claim 1 or 7, wherein the organic compound is selected to have the cross-linking functionality sterically hindered.

9. The method according to claim 8, wherein the organic compound is further selected from the group consisting of any one or more polymers comprising: polymerized units of t-butyl acrylate and 2-acrylamido-2-methylpropanesulfonic acid, and any combination in any proportion of the foregoing.

10. The method according to claim 1, wherein the organic compound is further selected from the group consisting of any one or more polymers comprising: polymerized units of t-butyl acrylate and 2-acrylamido-2-methylpropanesulfonic acid, and any combination in any proportion of the foregoing.

11. The method according to claim 1, wherein the organic compound is further selected from the group consisting of:

sulfonated styrene/maleic anhydride copolymer, a vinyl pyrrolidone/2-acrylamido-2-methylpropanesulfonie acid copolymer/acrylamide terpolymer, an 2-acrylamido-2-methylpropanesulfonic acid copolymer/N-N-dimethylacrylamide/acrylamide terpolymer, and any combination in any proportion of the foregoing.

12. A method for blocking the permeability of an elevated-temperature zone in a reservoir of a subterranean formation penetrated by a wellbore, the method comprising the steps of:
  a. forming a well treatment fluid comprising:
    i. water;
    ii. a water-soluble polymer comprising polymerized vinyl amine units;
    iii. an organic compound capable of crosslinking with the vinyl amine units of the water-soluble polymer; and
  b. injecting the well treatment fluid through the wellbore and into the zone; and
  c. injecting a breaker into the zone, the breaker adapted to break a gel formed by the well treatment fluid.

13. The method according to claim 12, wherein the water-soluble polymer further comprises polymerized vinyl alcohol units.

14. The method according to claim 1 or 13, wherein the water-soluble polymer comprises a copolymer of vinyl amine units and vinyl alcohol units.

15. The method according to claim 1 or 13, wherein the water-soluble polymer comprises up to 50 mole % polymerized vinyl amine units.

16. A method for blocking the permeability of an elevated-temperature zone in a reservoir of a subterranean formation penetrated by a wellbore, the method comprising the steps of:
  a. selecting the zone to be treated, wherein the upper limit of the temperature range of the zone is equal to or greater than 190° F. (88° C.);
  b. forming a well treatment fluid comprising:
    i. water;
    ii. a water-soluble polymer comprising polymerized vinyl amine units, wherein the water-soluble polymer further comprises polymerized vinyl alcohol units;
    iii. an organic compound capable of crosslinking with the vinyl amine units of the water-soluble polymer;
  c. selecting the water-soluble polymer and the organic compound of the well treatment fluid such that the gel time of the well treatment fluid is at least 2 hours when measured at the upper limit of the temperature range of the zone; and
  d. injecting the well treatment fluid through the wellbore and into the zone.

17. The method according to claim 16, wherein the upper limit of the temperature range of the zone is equal to or greater than 250° F. (121° C.).

18. The method according to claim 16 or 17, wherein the upper limit of the temperature range of the zone is equal to or less than 350° F. (177° C.).

19. The method according to claim 18, wherein the lower limit of the temperature range of the zone is equal to or greater than 190° F. (88° C.).

20. The method according to claim 16, wherein the lower limit of the temperature range of the zone is equal to or greater than 190° F. (88° C.).

21. A method for blocking the permeability of an elevated-temperature zone in a reservoir of a subterranean formation penetrated by a wellbore, the method comprising the steps of:
  a. selecting the zone to be treated, wherein the upper limit of the temperature range of the zone is equal to or greater than 190° F. (88° C.);
  b. forming a well treatment fluid comprising:
    i. water;
    ii. a water-soluble polymer comprising polymerized vinyl amine units;
    iii. an organic compound capable of crosslinking with the vinyl amine units of the water-soluble polymer;
  c. selecting the water-soluble polymer and the organic compound of the well treatment fluid such that the gel time of the well treatment fluid is at least 2 hours when measured at the upper limit of the temperature range of the zone;
  d. injecting the well treatment fluid through the wellbore and into the zone; and
  e. injecting a breaker into the zone, the breaker adapted to break a gel formed by the well treatment fluid.

22. The method according to claim 16 or 21, wherein the mole % of the polymerized vinyl amine units of the water-soluble polymer is selected to at least partially control the gel time of the well treatment fluid when measured at the upper limit of the temperature range of the zone.

23. The method according to claim 16 or 21, wherein the gel time of the well treatment fluid is less than 100 hours when measured at the upper limit of the temperature range of the zone.

24. The method according to claim 16 or 21, wherein the gel time is less than 30 hours when measured at the upper limit of the temperature range of the zone.

25. The method according to claim 16 or 21, further comprising the step of: delaying any substantial flowback from the zone for at least the gel time of the well treatment fluid after the step of injecting the well treatment fluid into the zone.

26. The method according to any one of claims 16 or 21, wherein the gel time is less than 30 hours when measured at 190° F. (88° C.).

27. The method according to claim 21, wherein the water-soluble polymer further comprises polymerized vinyl alcohol units.

* * * * *